(12) United States Patent
Zhang et al.

(10) Patent No.: US 10,284,099 B2
(45) Date of Patent: May 7, 2019

(54) HYBRID POWER CONVERTERS COMBINING SWITCHED-CAPACITOR AND TRANSFORMER-BASED STAGES

(71) Applicant: LINEAR TECHNOLOGY CORPORATION, Milpitas, CA (US)

(72) Inventors: Jindong Zhang, Fremont, CA (US); Jian Li, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 15/611,003

(22) Filed: Jun. 1, 2017

(65) Prior Publication Data

US 2017/0353116 A1 Dec. 7, 2017

Related U.S. Application Data

(60) Provisional application No. 62/346,881, filed on Jun. 7, 2016.

(51) Int. Cl.
*H02M 3/335* (2006.01)
*H02M 1/08* (2006.01)
(Continued)

(52) U.S. Cl.
CPC ......... *H02M 3/33523* (2013.01); *H02M 1/08* (2013.01); *H02M 3/07* (2013.01);
(Continued)

(58) Field of Classification Search
CPC ..... H02M 2007/4835; H02M 3/33523; H02M 1/08; H02M 3/07; H02M 3/073;
(Continued)

(56) References Cited

U.S. PATENT DOCUMENTS

| 5,761,058 A | 6/1998 | Kanda et al. |
| 6,349,044 B1 * | 2/2002 | Canales-Abarca ..... H02M 1/34 |
| | | 363/134 |

(Continued)

FOREIGN PATENT DOCUMENTS

| CN | 103296882 A | 9/2013 |
| CN | 103296882 A | 9/2013 |

(Continued)

OTHER PUBLICATIONS

Notification of Transmittal of the International Search Report and the Written Opinion of the International Searching Authority, dated Aug. 16, 2017, issued in corresponding International Application No. PCT/US2017/035588.

(Continued)

*Primary Examiner* — Jue Zhang
*Assistant Examiner* — Lakaisha Jackson
(74) *Attorney, Agent, or Firm* — Schwegman Lundberg & Woessner, P.A.

(57) ABSTRACT

A hybrid power converter circuit includes a switched-capacitor power converter stage and a pulse-width modulation (PWM) or resonant output circuit coupled to a switching node of the switched-capacitor power converter stage. In particular, the PWM or resonant output circuit can include a transformer having a primary winding and a secondary winding magnetically coupled to each other, and the secondary winding is coupled to the output node of the power converter. The switched-capacitor power converter stage is coupled between the input node of the power converter and the primary winding of the transformer, and includes capacitors and switches configured to connect the capacitors to the input node during a first phase of operation and connect the capacitors to the primary winding of the transformer of the (Continued)

PWM or resonant output circuit during a second phase of operation.

19 Claims, 7 Drawing Sheets

(51) Int. Cl.
    *H02M 3/07*     (2006.01)
    *H02M 3/337*     (2006.01)
    *H02M 1/00*     (2006.01)

(52) U.S. Cl.
    CPC ........... *H02M 3/073* (2013.01); *H02M 3/337* (2013.01); *H02M 3/33576* (2013.01); *H02M 3/33592* (2013.01); *H02M 2001/007* (2013.01); *H02M 2001/0048* (2013.01); *H02M 2001/0058* (2013.01); *H02M 2003/075* (2013.01); *H02M 2003/077* (2013.01)

(58) Field of Classification Search
    CPC ......... H02M 3/33576; H02M 3/33592; H02M 3/337; H02M 2001/0048; H02M 2001/0058; H02M 2001/007; H02M 2003/075; H02M 2003/077
    See application file for complete search history.

(56) References Cited

U.S. PATENT DOCUMENTS

2016/0072394 A1*   3/2016   Deboy .............. H02M 3/33592
                                                                                    363/21.1
2016/0190943 A1*   6/2016   Chen ..................... H02M 3/335
                                                                                     363/21.06

FOREIGN PATENT DOCUMENTS

WO         2015069516 A1     5/2015
WO     WO-2015069516 A1     5/2015

OTHER PUBLICATIONS

"International Application Serial No. PCT/US2017/035588, International Search Report dated Aug. 16, 2017", 3 pgs.
"International Application Serial No. PCT/US2017/035588, Written Opinion dated Aug. 16, 2017", 5 pgs.

\* cited by examiner

HYBRID POWER CONVERTERS COMBINING SWITCHED-CAPACITOR AND TRANSFORMER-BASED STAGES

CROSS-REFERENCE TO RELATED APPLICATION

This application claims benefit to U.S. Provisional Application No. 62/346,881, filed on Jun. 7, 2016, the disclosure of which is incorporated by reference herein in its entirety.

TECHNICAL FIELD

The present subject matter relates to techniques and equipment for power conversion that combine switched capacitor converters and transformer-based power converters approaches and circuits.

BACKGROUND

Power converters are used to convert electrical power having one voltage level (e.g., 12V) to electrical power having a different voltage level (e.g., 3V). Power converters can also be used to convert power having one type (e.g., alternating current (AC) power) to power having a different type (e.g., direct current (DC) power). Switching mode power converters are widely used because of their high efficiency. Generally, switching mode converters are either inductor and transformer based or capacitor based without a magnetic component.

In the case of a transformer-based architecture, the power converter includes two coils that are inductively coupled to each other, such as two coils sharing a common core formed of magnetic material. A primary coil is coupled to the input circuitry of the transformer, a secondary coil is coupled to the output circuitry of the transformer, and power conversion is provided according to a ratio of turns of the primary and secondary coils. In the case of a capacitor-based converter architecture, the power converter includes multiple switches (e.g., transistors such as field-effect transistors (FETs)) that operate under the control of a controller to selectively charge capacitors in series or in parallel, to provide a desired output power level.

Transformer-based converters are typically used for applications where isolation is required between input and output voltage rails, or application with a big voltage conversion ratio. However, transformer-based converters require large sized magnetic components due to their higher AC losses and limited switching frequency. A need therefore exists for a transformer architecture that can run at higher switching frequency and provide reduced magnetic component sizes.

Moreover, conventional transformer-based converters include forward, flyback, push-pull, half-bridge, and full-bridge PWM converters and various resonant converters. A typical example converts a 48 V input voltage to a 12 V output. For such a converter, because of the higher voltage stress on the input side, power MOSFETs (metal-oxide-semiconductor field effect transistors) on the transformer primary side are high-voltage rated MOSFETs that suffer not only from high switching losses but also have high conduction losses due to a high on-resistance Rds(on). As a result, the maximum switching frequency of the converter is limited due to the higher power dissipation and power device thermal stress. Because of the limited switching frequency, the conventional transformer-based solutions usually need a large size power transformer and large size output inductor and thus provide low converter power density. A need therefore exists for a transformer architecture that can provide reduced high power density while being configured to handle elevated voltage levels.

SUMMARY

The teachings herein alleviate one or more of the above noted problems with conventional power converters.

In accordance with one aspect of the disclosure, a power converter includes a switched-capacitor power converter stage and a pulse-width modulation (PWM) or resonant output circuit coupled to a switching node of the switched-capacitor power converter stage. In one example, the switched-capacitor power converter stage includes a plurality of switches and a plurality of capacitors, and the PWM or resonant output circuit includes a transformer having an input winding that is selectively coupled via switches of the plurality of switches to one or more capacitors of the plurality of capacitors, and that is inductively coupled to an output winding of the transformer.

In accordance with another aspect of the disclosure, a power converter has an input node for receiving a transformer input voltage and an output node for outputting a transformer output voltage. The power converter includes a transformer having a primary winding and at least one secondary winding magnetically coupled to each other, wherein the secondary winding is coupled to the output node of the power converter. The power converter further includes a switched capacitor circuit coupled between the input node and the primary winding of the transformer, the switched capacitor circuit comprising a plurality of capacitors and a plurality of switches configured to connect the capacitors to the input node during a first phase of operation and connect the capacitors to the primary winding during a second phase of operation. In one example, first and second capacitors of the plurality of capacitors of the switched capacitor circuit are coupled in series with each other and the input node during the first phase of operation, and the first and second capacitors are coupled in parallel with each other and to the primary winding during the second phase of operation.

In accordance with a further aspect of the disclosure, a power converter is configured to convert an input voltage to an output voltage. The power converter includes means for dividing the input voltage across a series connection of circuit elements to obtain a divided input voltage having a voltage level lower than the input voltage, and means for transforming the divided input voltage into the output voltage through at least two magnetically coupled coils. The means for dividing the input voltage can include switching means configured to selectively connect the circuit elements in a series connection and a parallel connection. The power converter can further include means for sensing the output voltage and for controlling the switching means according to the sensed output voltage.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and circuits disclosed herein relate to hybrid power converters. The hybrid converters combine a switched-capacitor circuit with a transformer-based output circuit (e.g., a pulse width modulation (PWM) circuit or a resonant frequency modulation circuit) within a same power stage to achieve high power density and high efficiency at high switching frequency. Compared to conventional transformer-based converters, the hybrid power converters have significantly reduced magnetic component sizes. Additionally, a feedback loop can be used to provide output regulation when needed. For high power/current applications, multiple converters can be paralleled with current sharing.

Reference now is made in detail to the examples illustrated in the accompanying drawings and discussed below.

Figure 1A:
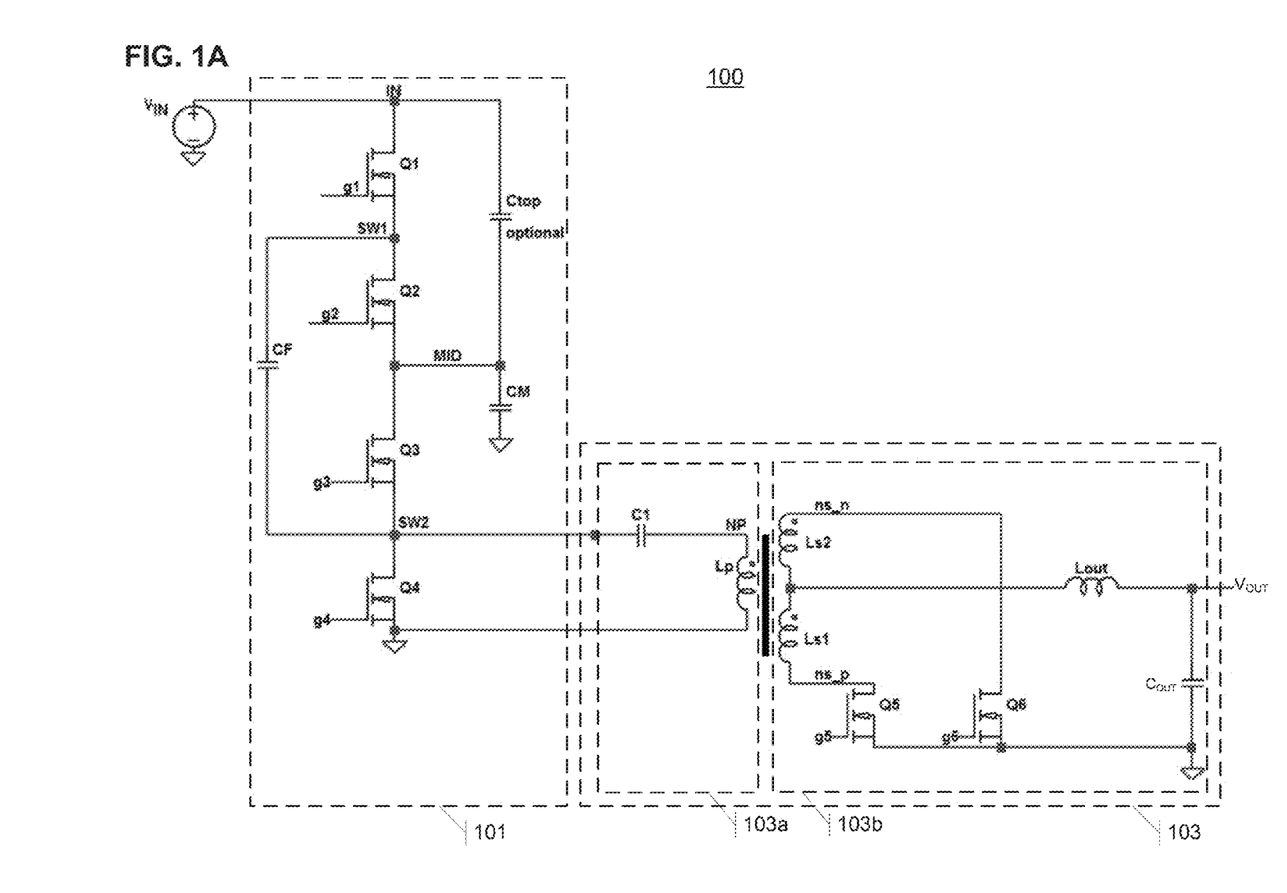
FIG. 1A is a circuit diagram of an illustrative transformer-based hybrid converter in accordance with the disclosure.

FIG. 1A is a circuit diagram of an illustrative transformer-based hybrid power converter in accordance with the disclosure. As shown, the transformer-based hybrid power converter 100 includes a switched-capacitor converter stage 101 and a transformer-based output circuit 103 coupled in series between the input node $V_{IN}$ and the output node $V_{OUT}$. The transformer-based output circuit 103 includes a primary side 103a and a secondary side 103b respectively connected to primary and secondary coil windings of a transformer.

Various circuit architectures of the switched-capacitor converter stage 101 and of the primary and secondary sides 103a and 103b of the transformer-based output circuit 103 are described in more detail in relation to FIGS. 2A-2G and FIG. 3, below.

Figure 1B:
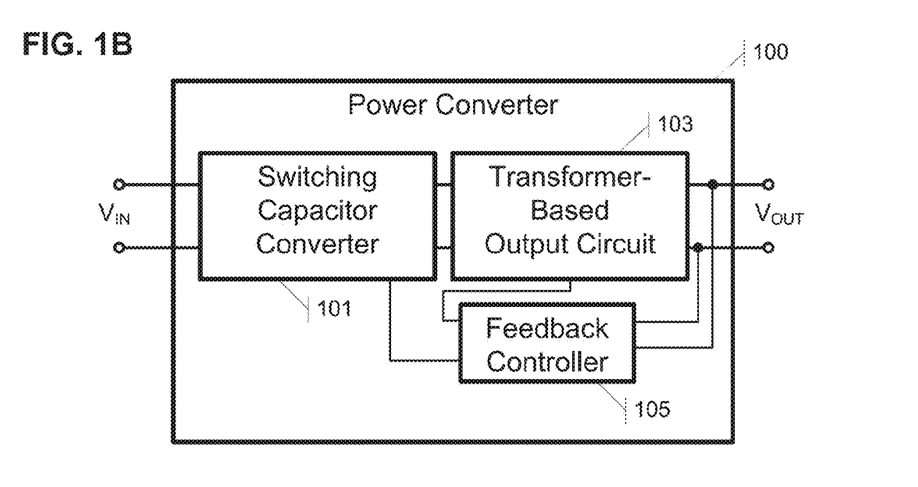
FIG. 1B is a high-level block diagram showing an architecture of a transformer-based hybrid converter in accordance with the disclosure.

As shown in FIG. 1A, the transformer-based hybrid power converter integrates the switched-capacitor converter 101 stage with the transformer-based output circuit 103 in a single power converter. The hybrid converter can be a non-regulated, open loop converter running at about 50% duty-cycle. Or, if output voltage regulation is required, a feedback controller 105 can monitor the level of the output voltage $V_{OUT}$ and regulate operation of the switched-capacitor converter 101 and/or the transformer-based output circuit 103 to maintain a desired output voltage level, as shown in the block diagram of FIG. 1B. In particular, the feedback controller 105 may measure or sense the output voltage level $V_{OUT}$ at the output node(s), and may control the operation of switches in the switched-capacitor converter 101 and/or the transformer-based output circuit 103 to regulate the voltage level $V_{OUT}$ at the desired level. For example, the feedback controller 105 can control the switching duty-cycle or switching frequency of switches of the switched-capacitor converter 101 to thereby regulate the voltage level $V_{OUT}$. Especially, in situations in which the transformer-based output circuit 103 is a synchronous PWM converter that includes switches, the feedback controller 105 can control a pulse width of switching of the switches of the transformer-based output circuit 103 to regulate the voltage level $V_{OUT}$. In situations in which the transformer-based output circuit 103 is a resonant converter, the feedback controller 105 can control the switching frequency of the switches of the output circuit 103 to regulate the voltage level $V_{OUT}$. In such situations, a synchronous step-down controller can for example be used as the feedback controller 105 to control operation of the output circuit 103 and of the switched-capacitor converter 101 in a feedback loop.

FIG. 1A shows one implementation of the primary side circuit of the hybrid power converter. The primary side circuit includes the switched-capacitor converter 101 and the primary side 103a of the transformer-based output circuit 103. As shown, the switched-capacitor converter 101 is a switched-capacitor voltage divider converter. The switched-capacitor voltage divider converter on the primary side can have a ratio of 2:1, from the IN node to the MID node, as illustratively shown in FIG. 1A, but could more generally have a different step-up or step-down ratio (e.g., a 3:1 ratio, a 4:1 ratio, a 3:2 ratio, a 4:3 ratio, or the like) with different switched capacitor topologies such as those shown in FIGS. 4A-4D, for example. In FIG. 1A, the power MOSFETs of the switched-capacitor voltage divider converter are only exposed to voltage stress of $V_{IN}/2$ because the series interconnection of the capacitors CF and CM between the input node IN and ground (through switches Q1 and Q3) serve to divide the input voltage by two.

In FIG. 1A, switches Q3 and Q4 are shared by the front-end switching capacitor converter 101 and the transformer-based output circuit 103. The voltage of node MID, which is also the voltage across capacitor CM, serves as the input voltage of the transformer-based output circuit 103. The output voltage $V_{OUT}$ can be controlled by the PWM duty-cycle of switch Q3. The primary side 103a of the transformer-based output circuit 103 also includes a transformer primary side winding NP connected to the switched-capacitor converter 101 at the switching node SW2 through a DC-decoupling capacitor C1. The DC-decoupling capacitor C1 ensures that the transformer primary side winding NP is only provided with AC voltage in steady state. The secondary side 103b of the transformer-based output circuit 103 includes synchronous rectifier switches Q5 and Q6 used for increasing high efficiency, though the switches Q5 and Q6 can alternatively be replaced by power diodes (see, e.g., FIG. 2D) if a simplified circuit providing lower efficiency is desired.

Figure 1C:
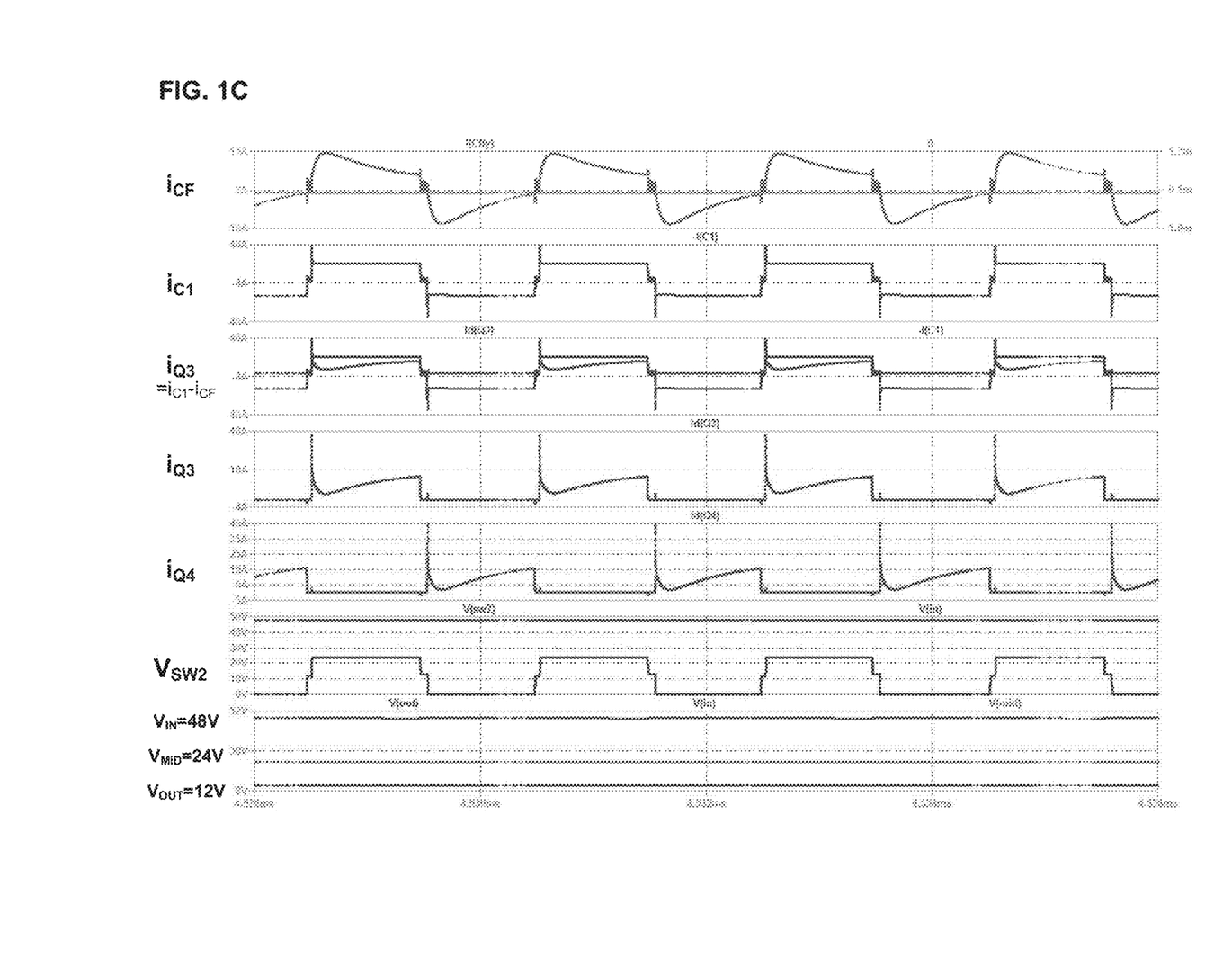
FIG. 1C shows a series of plots showing simulation results associated with the illustrative transformer-based hybrid converter of FIG. 1A.

FIG. 1C shows simulation waveforms associated with the functioning of the circuit of FIG. 1A. Specifically waveforms showing the current $i_{CF}$ flowing through flying capacitor CF, the current $i_{C1}$ flowing through capacitor C1 and transformer winding NP, the current $i_{Q3}$ flowing through switch Q3, the current $i_{Q4}$ flowing through switch Q4, the voltage $V_{SW2}$ at switching node SW2, the voltage $V_{MID}$ at node MID, the input voltage $V_{IN}$ and the output voltage $V_{OUT}$ are shown through several cycles of operation of the hybrid converter 100.

As shown in FIG. 1C, in the switched-capacitor converter 101, the flying capacitor current $i_{CF}$ starts and ends near 0A in each switching cycle. Therefore the MOSFETs Q1-Q2 run at a zero-current switching condition with minimum switching losses, while the MOSFETs Q3-Q4 serve as the switched-capacitor FETs and integrated PWM converter FETs. The MOSFETs Q1-Q4 have reduced voltage stress (e.g., the voltage across Q1-Q4 remains at or below $V_{IN}/2$) and therefore lower voltage rated FETs can be used as the MOSFETs Q1-Q4. In general, FETs with lower voltage ratings, such as FETs used as the MOSFETs Q1-Q4, have lower on-resistance than FETs with higher voltage ratings. Furthermore, $i_{Q3}=i_{C1}-i_{CF}$ during the FET conduction time period, so the Q3 and Q4 switches current stresses are reduced, as compared to a conventional transformer-based power converter. The reduced voltage and current stresses of the hybrid converter switches allows the converter to be more efficient. As a result, the converter 100 can run at a much higher switching frequency $f_{sw}$ without suffering high power losses, resulting in significantly reduced transformer and power inductor size and resulting in a high power density.

In operation of the switched-capacitor converter stage 101, the feedback controller 105 controls operation of the MOSFET switches Q1-Q4. Generally, switches Q1 and Q3 are operated in unison, and switches Q2 and Q4 are operated in unison. Further, switches Q1 and Q3 are operated complementarily to switches Q2 and Q4 such that switches Q1 and Q3 are generally not open/conducting at the same time as switches Q2 and Q4.

In this manner, in one example, switches Q1 and Q3 are closed during a first phase of operation while switches Q2 and Q4 are open. In turn, during a second phase of operation, switches Q1 and Q3 are open while switches Q2 and Q4 are closed. In the example, the power converter may alternate between the first and second phases of operation, and the feedback controller 105 may vary the relative lengths of the first and second phases (e.g., control the pulse width of signals controlling the switches Q1-Q4) in order to regulate the output voltage level $V_{OUT}$ to reach (and maintain) a particular voltage. During the first phase of operation, the capacitors $C_F$ and $C_M$ are coupled in series between $V_{IN}$ and ground by closed switches Q1 and Q3, and the capacitors are charged by the voltage $V_{IN}$. In this phase of operation, the switching node SW2 common to capacitors $C_F$ and $C_M$ may thus be charged to a voltage of approximately $V_{IN}/2$. In turn, during the second phase of operation, the capacitors $C_F$ and $C_M$ are coupled in parallel with each other, and the switching node SW2 is brought to a ground voltage by switch Q4.

Overall, as shown in FIG. 1C, the 48 V input signal $V_{IN}$ is converted into an output voltage $V_{OUT}$ of close to 12 V using a duty cycle close to 50%. The simulation also shows that the converter has another advantage. Specifically, the switched-capacitor converter current and the integrated PWM converter current are on the opposite direction through FET Q3 and Q4 in each switching cycle. Therefore, the FET Q3 and Q4 net current stress is reduced, resulting in reduced power losses and potentially high efficiency and power density.

As shown in the example of FIG. 1A, the primary side 103a of the transformer-based output circuit 103 is coupled to the switching node SW2 of the switched-capacitor converter 101. Alternatively, the primary side 103a of the transformer-based output circuit 103 can be coupled to the switching node SW1 and the node MID of the switched-capacitor converter 101.

FIG. 1A additionally shows an illustrative secondary side 103b of the transformer-based output circuit 103 stage in a single power converter. The secondary side 103b circuitry shown in FIG. 1A is one example of a secondary side circuit that can be used in the hybrid power converter 100. Other examples of transformer secondary side circuits are shown in FIGS. 2A-2D among others.

Figure 2A:
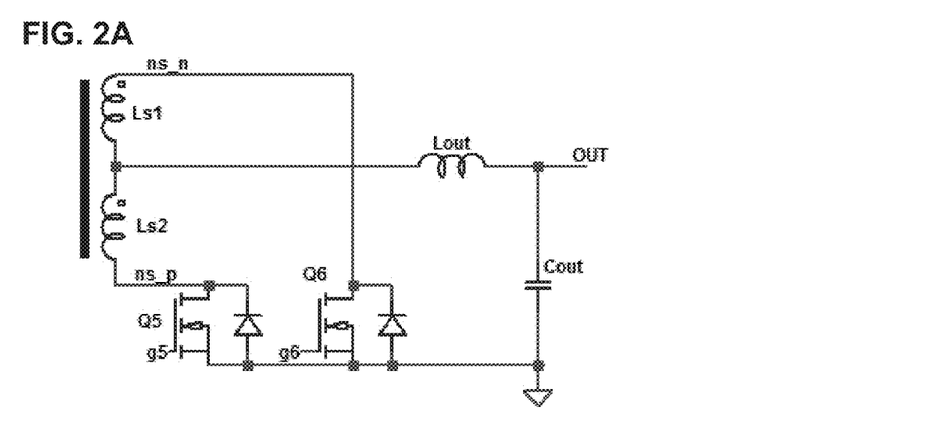
FIGS. 2A-2G, 3, and 4A-4D are circuit diagrams showing illustrative circuits that can be used as components of a transformer-based hybrid converter in accordance with the disclosure.
Figure 2B:
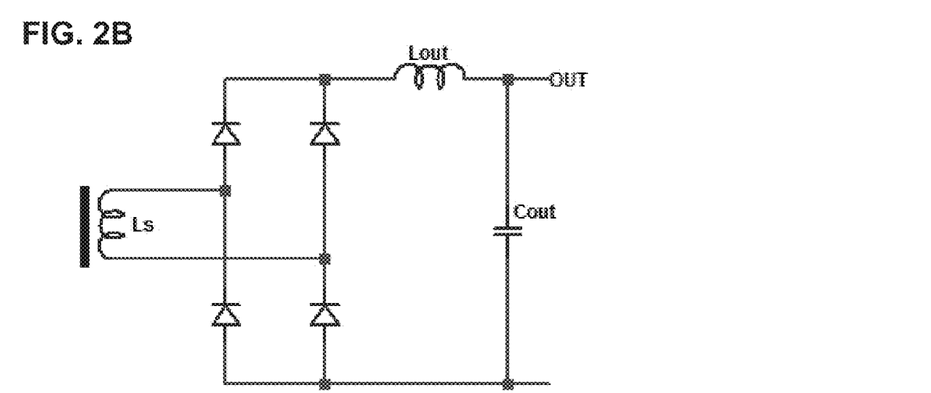
Figure 2C:
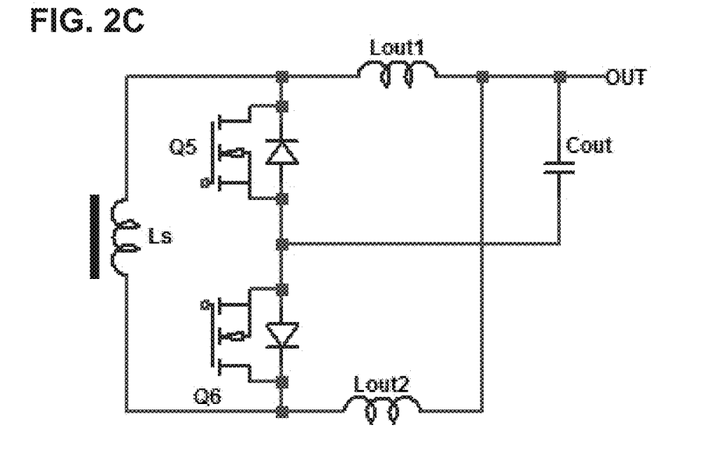
Figure 2D:
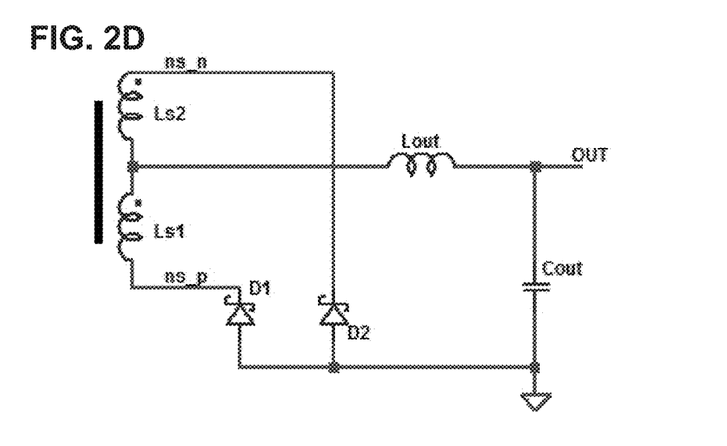

In particular, FIGS. 2A-2D show possible configurations of the coupled transformer secondary side 103b winding rectifier circuits. FIGS. 2A and 2D are examples of center-tapped winding structures with synchronous rectifier output in which a center-tap on the secondary coil winding of the transformer provides two secondary side coil windings Ls1 and Ls2 that are both magnetically coupled to the input coil winding NP, similarly to the transformer secondary side 103b shown in FIG. 1A. FIG. 2B is a full-bridge rectifier output, and FIG. 2C is a current doubler synchronous rectifier output. The synchronous rectifiers of FIGS. 2A and 2C can be used for high efficiency, especially for applications with lower $V_{OUT}$. A non-synchronous rectifier output stage, such as those shown in FIGS. 2B and 2D, are simpler but less efficient and can be used for applications with higher $V_{OUT}$ voltages.

Figure 2E:
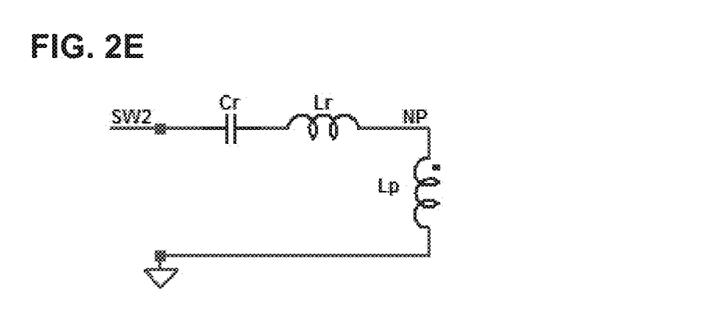
Figure 2F:
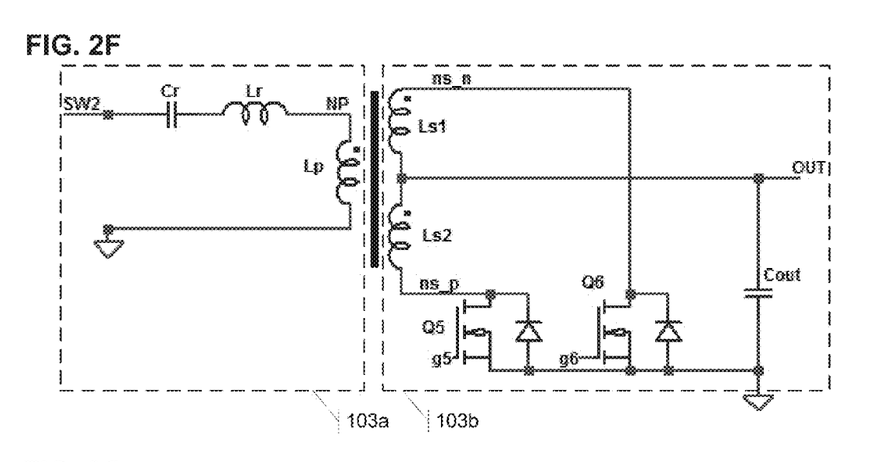
Figure 2G:
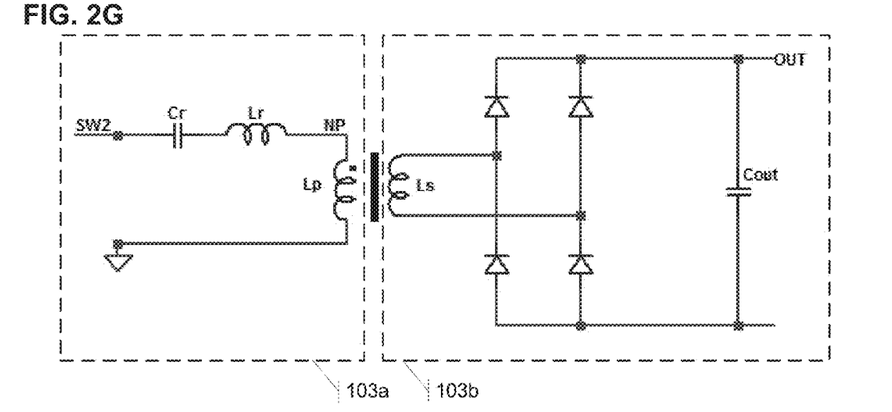

The primary side 103a circuitry shown in FIG. 1A is one illustrative example of a primary side circuit that can be used a hybrid power converter, and various other primary side circuits can alternatively be used. For example, FIG. 2E shows that the integrated hybrid converter 103 can be a resonant converter with a resonant inductor Lr and a resonant capacitor Cr coupled in series between switching node SW2 of the switched-capacitor converter 101 and the transformer's primary winding NP. Alternatively, the resonant inductor Lr and resonant capacitor Cr can be coupled in series between switching node SW1 and the transformer's primary winding NP, while the other terminal of NP is connected to node MID. In both cases, the secondary winding(s) Ns of the transformer can be coupled to any of the secondary side rectifier circuits shown in FIGS. 2F and 2G. Additionally, FIGS. 2F and 2G show integrated resonant LLC converter structures which do not need an output inductor in the secondary side rectifier circuit. In the circuits of FIGS. 2F and 2G, the primary sides 103a are the same as that shown in FIG. 2E, while the secondary sides 103b include modified circuits that do not include any inductor.

Figure 3:
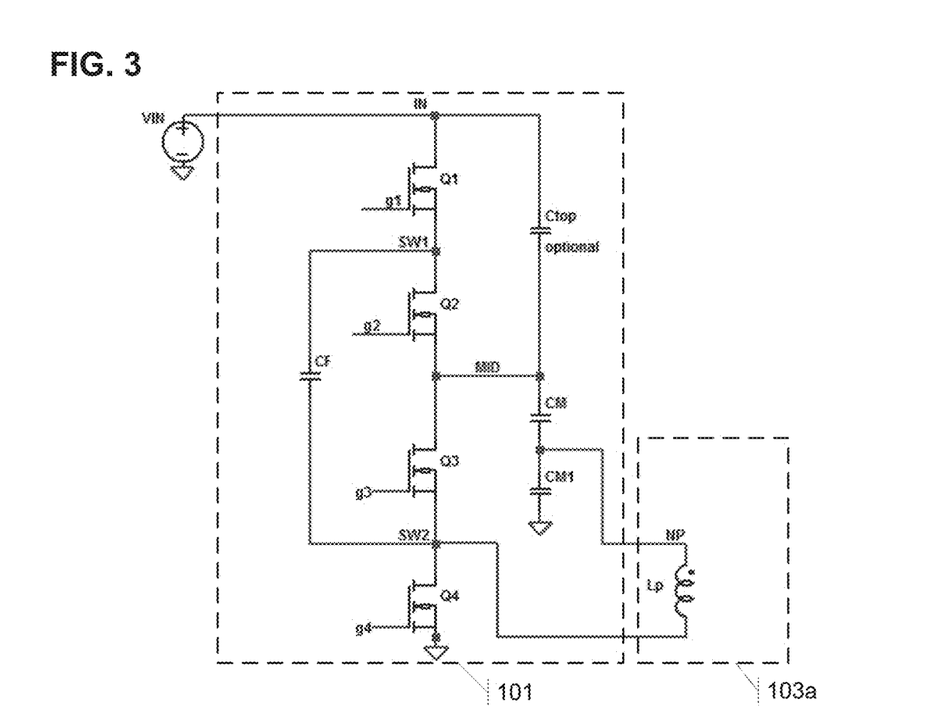

FIG. 3 shows another illustrative implementation of a switched-capacitor converter stage 101 and primary side 103a circuit. In the illustrative implementation of FIG. 3, the circuit integrates the switched-capacitor converter 101 with an isolated half-bridge converter. The switched-capacitor converter stage 101 of FIG. 3 can be used in conjunction with any of the primary side 103a and/or secondary side 103b circuitry shown and described in relation to FIGS. 1A and 2A-2G.

Figure 4A:
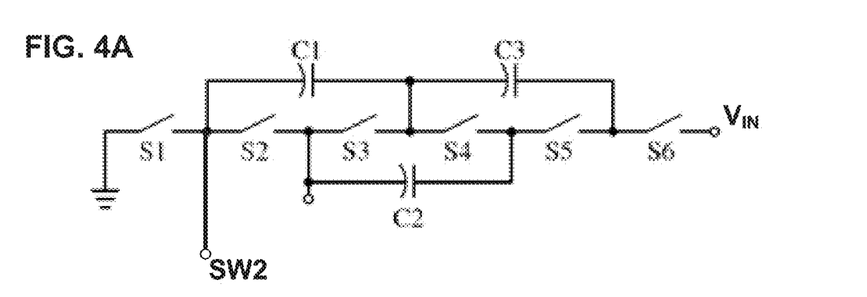
Figure 4B:
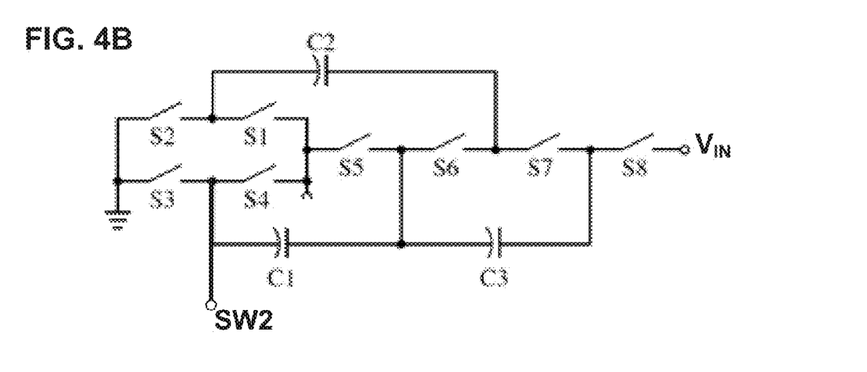
Figure 4C:
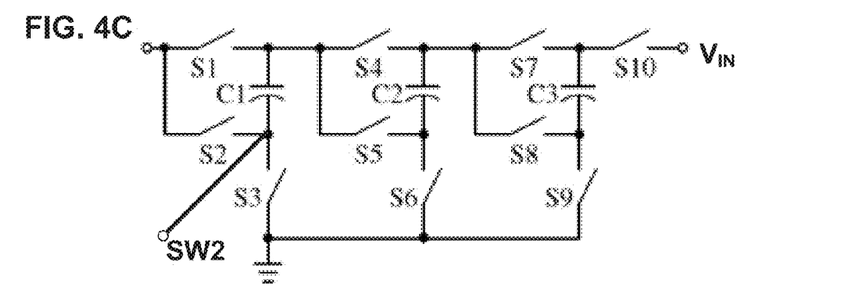
Figure 4D:
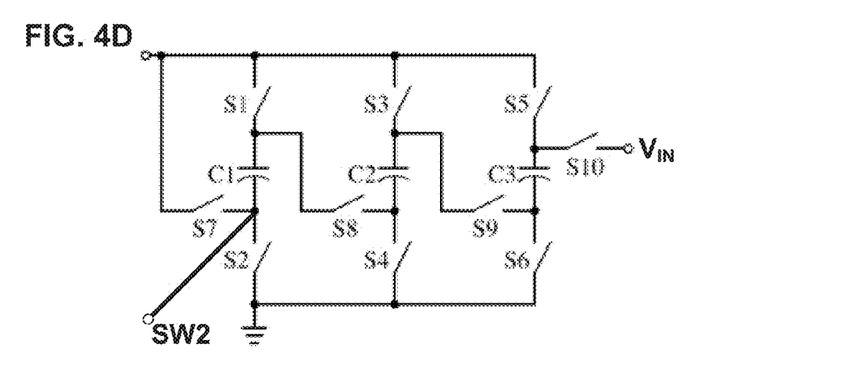

FIGS. 4A-4D show various alternative implementations of switched-capacitor converter stage 101 circuits that can be used in combination with any of the transformer-based output circuits 103 (including primary side 103a and secondary side 103b circuitry) described above. In FIGS. 4A-4D, each of the switched-capacitor converter stages 101 includes combinations of capacitors and switches coupled between the input node $V_{IN}$ and the node $V_{SW2}$ that is coupled to the primary side 103a of the transformer-based output circuit 103. In detail, FIG. 4A shows an illustrative capacitor ladder circuit including six switches S1-S6 and three capacitors C1-C3; FIG. 4B shows an illustrative Dickson circuit including eight switches S1-S8 and three capacitors C1-C3; FIG. 4C shows an illustrative Fibonacci circuit including ten switches S1-S10 and three capacitors C1-C3; and FIG. 4D shows an illustrative Series-Parallel circuit including ten switches S1-S10 and three capacitors C1-C3.

In operation, in the circuit of FIG. 4A, the feedback controller 105 controls operation of the MOSFET switches S1-S4. Generally, switches S2, S4, and S6 are operated in unison, and switches S1, S3, and S5 are operated in unison. Further, switches S2, S4, and S6 are operated complementarily or with 180 degree phase shift to switches S1, S3, and S5 such that switches S2, S4, and S6 are generally not open/conducting at the same time as switches S1, S3, and S5.

In the circuit of FIG. 4B, the feedback controller 105 controls operation of the MOSFET switches S1-S8. Generally, switches S2, S4, S6, and S8 are operated in unison, and switches S1, S3, S5, and S7 are operated in unison. Further, switches S2, S4, S6, and S8 are operated complementarily or with 180 degree phase shift to switches S1, S3, S5, and S7 such that switches S2, S4, S6, and S8 are generally not open/conducting at the same time as switches S1, S3, S5, and S7.

In the circuit of FIG. 4C, the feedback controller 105 controls operation of the MOSFET switches S1-S10. Generally, switches S2, S4, S6, S8, and S10 are operated in unison, and switches S1, S3, S5, S7, and S9 are operated in unison. Further, switches S2, S4, S6, S8, and S10 are operated complementarily or with 180 degree phase shift to switches S1, S3, S5, S7, and S9 such that switches S2, S4, S6, S8, and S10 are generally not open/conducting at the same time as switches S1, S3, S5, S7, and S9.

In the circuit of FIG. 4D, the feedback controller 105 controls operation of the MOSFET switches S1-S10. Generally, switches S1-S6 are operated in unison, and switches S7-S10 are operated in unison. Further, switches S1-S6 are operated complementarily or with 180 degree phase shift to switches S7-S10 such that switches S1-S6 are generally not open/conducting at the same time as switches S7-S10.

The converters described herein can be bi-directional converters. Additionally, the switched-capacitor converters 101 are not limited to 2:1 step down voltage dividers. More generally, the switched-capacitor converter 101 used in the hybrid converter 100 can be a n:1 switched-capacitor converter.

The proposed transformer-based hybrid power converters provide for reduced voltage stress and reduced power loss on the integrated FETs of the transformer-based output circuit stage as compared to FETs in a conventional PWM or resonant converter. As a result, the hybrid converters advantageously allow for lower power losses and higher switching frequencies, smaller magnetic component sizes, and higher power density.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Additionally, any element that is described as being "connected to" or "coupled to" another element can be directly "connected to" or "coupled to" the other element, or one or more other elements can be connected or coupled in between. In contrast, when an element is referred to as being "directly connected to" or "directly coupled to" the other element, there may be no intervening elements between them.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A power converter comprising:
a switched-capacitor power converter stage including first and second switches connected in series between an input node of the power converter and a ground node, wherein the second switch is directly connected between the first switch and the ground node; and a pulse-width modulation (PWM) or resonant output circuit having a first input node connected to a switching node common to the first and second switches of the switched-capacitor power converter stage and having a second input node directly connected to the ground node, wherein the PWM or resonant output circuit comprises:
a power transformer having an output winding inductively coupled to only a single input winding, and
two inductors, each respective inductor of the two inductors being coupled between a respective side of the output winding and an output power node of the PWM or resonant output circuit.

2. The power converter of claim 1, wherein the PWM or resonant output circuit comprises two diodes, each of the diodes having a first node coupled to a respective side of the output winding and a second node coupled to the output node of the power converter, and an output capacitor coupled to and between the output node and a node linking each of the diodes.

3. The power converter of claim 1, wherein:
the switched-capacitor power converter stage further includes a plurality of capacitors,
wherein the input winding is selectively coupled via the first and second switches to one or more capacitors of the plurality of capacitors.

4. The power converter of claim 3, wherein the first and second switches of the switched-capacitor power converter are operated according to a pulse width of operation of the PWM output circuit or according to a frequency modulation operation of the resonant output circuit.

5. The power converter of claim 3, further comprising:
a feedback controller controlling the switching of the first and second switches of the switched-capacitor power converter based on a voltage level at an output of the PWM or resonant output circuit.

6. The power converter of claim 5, wherein the feedback controller either sets a pulse width of operation of the plurality of switches of the PWM output circuit or sets a frequency modulation of the resonant output circuit.

7. The power converter of claim 5, wherein the feedback controller operates the first and second switches of the switched-capacitor power converter at a pulse width of operation of the PWM output circuit or at a frequency modulation operation of the resonant output circuit.

8. A power converter having an input node for receiving a transformer input voltage and an output node for outputting a transformer output voltage, the power converter comprising:
a transformer having only a single primary winding and at least one secondary winding magnetically coupled to each other, wherein the secondary winding is coupled to the output node of the power converter; and
a switched capacitor circuit comprising first and second switches coupled in series between the input node and a ground node,
wherein the second switch is directly connected between the first switch and the ground node, the switched capacitor circuit has a first node of the primary winding of the transformer connected to the ground node and a second node of the primary winding of the transformer connected to a switching node common to the first and second switches, the switched capacitor circuit further comprises a plurality of capacitors, and the first and second switches are configured to connect the plurality of capacitors to the input node during a first phase of operation and connect the plurality of capacitors to the primary winding during a second phase of operation,
wherein the power converter comprises two inductors, each of the two inductors being coupled between a respective side of the at least one secondary winding and the output node.

9. The power converter of claim 8, wherein first and second capacitors of the plurality of capacitors of the switched capacitor circuit are coupled in series with each other and the input node during the first phase of operation, and the first and second capacitors are coupled in parallel with each other and to the primary winding during the second phase of operation.

10. The power converter of claim 8, wherein the feedback controller is configured to adjust relative lengths of the first and second phases of operation of the switched capacitor circuit according to the sensed transformer output voltage.

11. The power converter of claim 8, further comprising:
two diodes, each of the diodes having a first node coupled to a respective side of the at least one secondary winding and a second node coupled to the output node of the power converter; and
an output capacitor coupled to and between the output node and a node linking each of the diodes.

12. The power converter of claim 11, further comprising a switch coupled in parallel with each of the diodes between the first and second nodes.

13. The power converter of claim 8, further comprising a full-bridge diode rectifier circuit coupled to the secondary winding of the transformer.

14. The power converter of claim 8, further comprising an inductor coupled between the switched capacitor circuit and the primary winding of the transformer.

15. The power converter of claim 8, further comprising a feedback controller configured to sense the transformer output voltage at the output node, and to control operation of the switched capacitor circuit according to the sensed transformer output voltage.

16. A power converter configured to convert an input voltage received at an input node to an output voltage, the power converter comprising:
means for dividing the input voltage across a series connection of circuit elements to obtain a divided input voltage having a voltage level lower than the input voltage; and
means for transforming the divided input voltage into the output voltage through a transformer having an output coil inductively coupled to only a single input coil and a synchronous current doubling rectifier output stage coupled across the output coil,
wherein the means for dividing the input voltage comprise first and second switching means connected in series between the input node and a ground node, the second switching means is directly connected between the first switching means and the ground node, and wherein the means for dividing the input voltage comprises the single input coil being connected between the ground node and a node common to the first and second switching means.

17. The power converter of claim 16, wherein the synchronous current doubling rectifier output stage comprises two diodes, each of the diodes having a first node coupled to a respective side of the output coil and a second node coupled to the output node of the power converter, and an output capacitor coupled to and between the output node and a node linking each of the diodes.

18. The power converter of claim 16, wherein the first and second switching means of the means for dividing the input voltage are configured to selectively connect the circuit elements in a series connection and a parallel connection.

19. The power converter of claim 18, further comprising:
    means for sensing the output voltage and for controlling the switching means according to the sensed output voltage.

* * * * *